US012249356B1

(12) United States Patent
Lee et al.

(10) Patent No.: US 12,249,356 B1
(45) Date of Patent: Mar. 11, 2025

(54) HEAT-ASSISTED MAGNETIC RECORDING HEAD WITH A RESONANCE ENHANCING FEATURE

(71) Applicant: Seagate Technology LLC, Fremont, CA (US)

(72) Inventors: Tae-Woo Lee, Eden Prairie, MN (US); YongJun Zhao, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/529,302

(22) Filed: Dec. 5, 2023

Related U.S. Application Data

(60) Provisional application No. 63/386,209, filed on Dec. 6, 2022.

(51) Int. Cl.
*G11B 5/31* (2006.01)
*G11B 5/00* (2006.01)

(52) U.S. Cl.
CPC .... *G11B 5/3136* (2013.01); *G11B 2005/0021* (2013.01)

(58) Field of Classification Search
None
See application file for complete search history.

(56) References Cited

U.S. PATENT DOCUMENTS 8,248,896 B1 * 8/2012 Yuan .................... G11B 5/3136 369/112.27
8,322,022 B1 * 12/2012 Yi .......................... G11B 5/314 369/13.13
10,811,035 B1 * 10/2020 Lee ...................... G11B 5/1872
10,839,830 B1 11/2020 Peng et al.
2003/0112542 A1 * 6/2003 Rettner .................. G11B 5/314 360/59
2003/0123335 A1 * 7/2003 Rettner ................ G11B 5/3103
2022/0319543 A1 * 10/2022 Puri ....................... G11B 13/08

* cited by examiner

*Primary Examiner* — Peter Vincent Agustin
(74) *Attorney, Agent, or Firm* — Kagan Binder, PLLC

(57) ABSTRACT

A heat-assisted magnetic recording head includes a near-field transducer, a waveguide, and a resonance enhancing feature. The near-field transducer is configured to focus and emit an optical near-field. The waveguide is configured to receive electromagnetic radiation and propagate the electromagnetic radiation toward and proximal to the near-field transducer. The resonance enhancing feature is disposed proximal to the near-field transducer and to a media-facing surface of the heat-assisted magnetic recording head. The resonance enhancing feature includes a first segment and a second segment disposed on opposite sides of the near-field transducer relative to a cross-track dimension of the heat-assisted magnetic recording head. Each of the first segment and the second segment of the resonance enhancing feature includes a liner and a filler. The liner of each of the first segment and the second segment at least partially faces the near-field transducer. The filler of each of the first segment and the second segment is disposed distal to the near-field transducer relative to the liner of the respective segment.

29 Claims, 5 Drawing Sheets

HEAT-ASSISTED MAGNETIC RECORDING HEAD WITH A RESONANCE ENHANCING FEATURE

CROSS-REFERENCE TO RELATED APPLICATIONS

This application claims the benefit of U.S. Provisional Patent Application having Ser. No. 63/386,209 titled "HEAT-ASSISTED MAGNETIC RECORDING HEAD WITH A RESONANCE ENHANCING FEATURE" filed Dec. 6, 2022, the entire contents of which are incorporated by reference for all purposes herein.

TECHNICAL FIELD

The disclosure relates to a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD (hereafter, a HAMR head) typically includes a laser, a near-field transducer (NFT), and a write pole. The laser emits electromagnetic radiation that resonates with free electrons of the NFT to excite localized surface plasmons (LSPs) on the NFT. The NFT is configured to emit a near-field of the LSPs. The near-field briefly heats a small spot on a surface of a magnetic disk of the HDD. The write pole is configured to write data to the magnetic disk in the vicinity of the heated spot. Low resonance efficiency between electromagnetic radiation from the laser and free electrons of the NFT may increase the laser power that is required for the HAMR head to operate. A higher laser power may increase the operating temperature of the NFT and may result in thermally induced defects that can reduce the lifetime of the HAMR head.

A prior art HAMR head with a near filed transducer with reflective heatsink structures is described in U.S. Pat. No. 10,839,830, the disclosure of which is fully incorporated by reference, and that is commonly owned by the Assignee of the present invention.

SUMMARY

The present disclosure describes a heat-assisted magnetic recording (HAMR) head having a resonance enhancing feature disposed proximal to a near-field transducer (NFT) of the HAMR head. The resonance enhancing feature is configured to improve resonance between free electrons of the NFT and incident electromagnetic radiation from a laser of the HAMR head. Improving resonance may increase the efficiency of localized surface plasmon (LSP) formation and may reduce the laser power that is required to operate the HAMR head. Reduced laser power may enable a lower operating temperature, potentially reducing the formation of thermally induced defects and improving the reliability and/or lifetime of the HAMR head.

In one example, a HAMR head includes an NFT configured to focus and emit an optical near-field; a waveguide configured to receive electromagnetic radiation and propagate the electromagnetic radiation toward and proximal to the NFT; and a resonance enhancing feature disposed proximal to the NFT and to a media-facing surface of the HAMR head, the resonance enhancing feature including a first segment and a second segment disposed on opposite sides of the NFT relative to a cross-track dimension of the HAMR head, wherein each of the first segment and the second segment of the resonance enhancing feature includes: a liner that at least partially faces the NFT; and a filler disposed distal to the NFT relative to the liner.

In another example, a HAMR head includes an NFT configured to focus and emit an optical near-field; a waveguide configured to receive electromagnetic radiation and propagate the electromagnetic radiation toward and proximal to the NFT; and a resonance enhancing feature disposed proximal to the NFT and to a media-facing surface of the HAMR head, the resonance enhancing feature including a first segment and a second segment disposed on opposite sides of the NFT relative to a cross-track dimension of the HAMR head, wherein each of the first segment and the second segment of the resonance enhancing feature includes: a liner that at least partially faces the NFT; and a filler disposed distal to the NFT relative to the liner, wherein each of the first segment and the second segment includes an edge, wherein a part of the edge of each of the first segment and the second segment faces the NFT, and wherein each edge is separated from the NFT by a gap.

In another example, a HAMR head includes an NFT configured to focus and emit an optical near-field; a waveguide configured to receive electromagnetic radiation and propagate the electromagnetic radiation toward and proximal to the NFT; and a resonance enhancing feature disposed proximal to the NFT and to a media-facing surface of the HAMR head, the resonance enhancing feature including a first segment and a second segment disposed on opposite sides of the NFT relative to a cross-track dimension of the HAMR head, wherein each of the first segment and the second segment of the resonance enhancing feature includes: a liner that at least partially faces the NFT; and a filler disposed distal to the NFT relative to the liner, wherein each of the first segment and the second segment has a height in a media-facing dimension of the HAMR head, and wherein each of the first segment and the second segment are elongated in a cross-track dimension of the HAMR head.

These and other features and aspects of various examples may be understood in view of the following detailed discussion and accompanying drawings.

DETAILED DESCRIPTION

Figure 1:
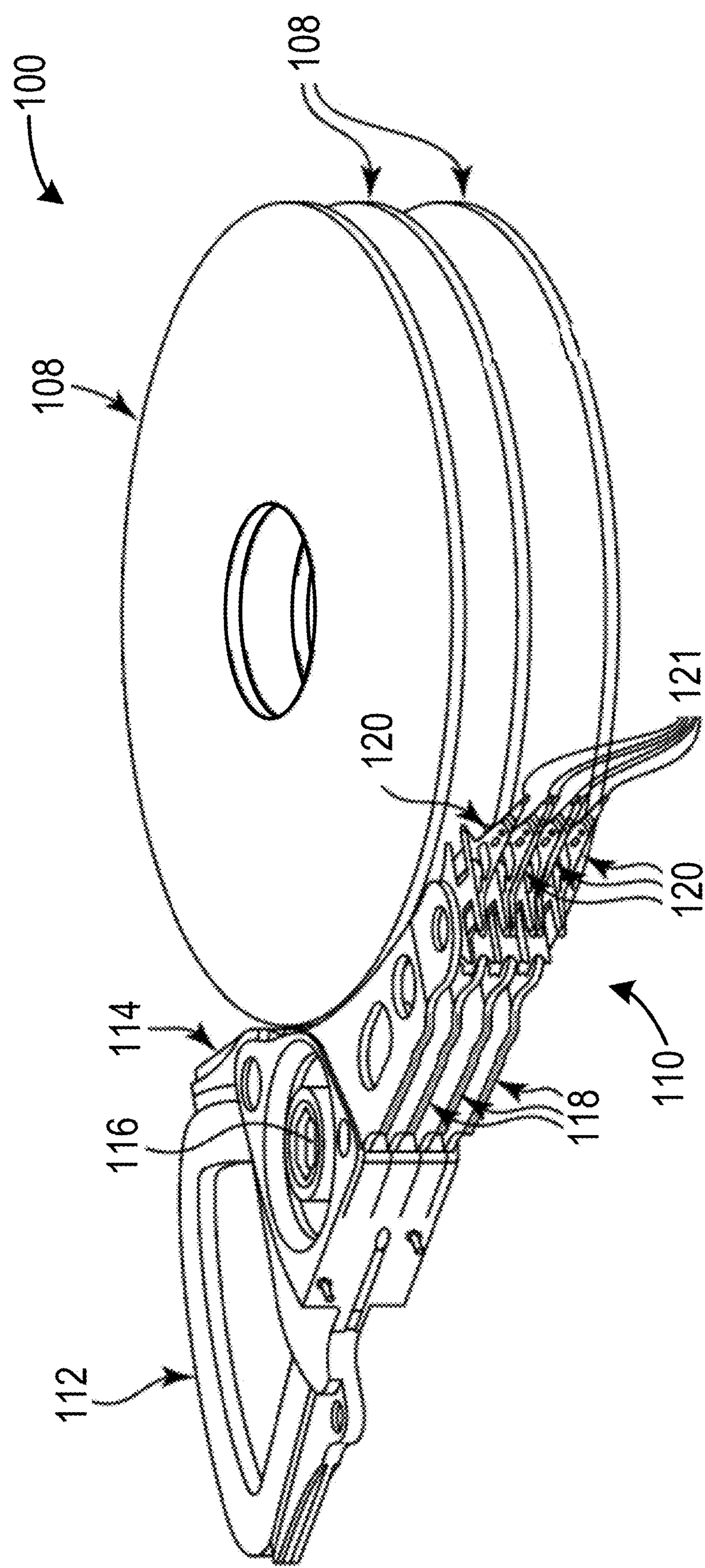
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 121. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 121, to move relative to magnetic disks 108.

Figure 2:
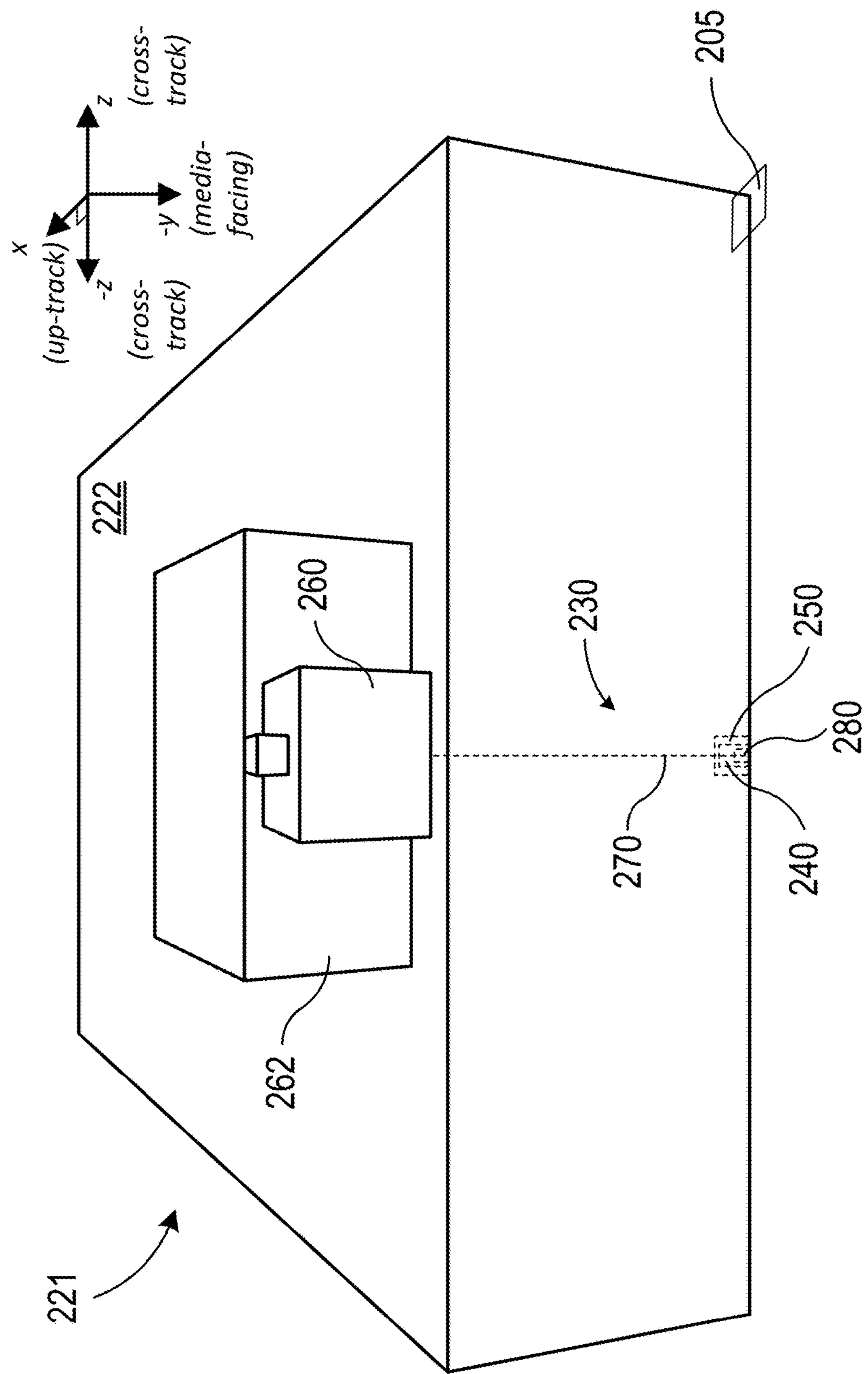
FIG. 2 is a perspective view of an example slider, in accordance with aspects of this disclosure.

FIG. 2 is a perspective view of an example slider 221, in accordance with aspects of this disclosure. Slider 221 may be an example of a slider 121 of FIG. 1. In the example of FIG. 2, slider 221 includes a slider body 222, a laser 260, and a submount 262.

Slider body 222 is configured to contain components of a HAMR head 230. Slider body 222 may include a segment of a wafer that components of HAMR head 230 are fabricated on (e.g., an aluminum titanium carbide wafer). HAMR head 230 is configured to read data from and write data to a surface of a magnetic disk (e.g., a magnetic disk 108 of FIG. 1).

Components of HAMR head 230 of FIG. 2 include a reader 240, a writer 250, a waveguide 270, and a near-field transducer (NFT) 280. HAMR head 230 may include other components that are not included in this view (e.g., heaters, heat sinks). Some features or parts of features of components of HAMR head 230 (e.g., reader 240, writer 250, NFT 280) may be presented on a media-facing surface 205 of slider body 222. Slider 221, and thus components of HAMR head 230, may be maintained at an approximate spacing (e.g., a head-media spacing) from a surface of the magnetic disk during some operations of HDD 100 (e.g., read operations, write operations). During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 222.

Reader 240 is configured to generate a signal (e.g., a voltage change) in response to magnetic flux changes from bits of data on a magnetic disk (e.g., a magnetic disk 108 of FIG. 1). Reading of data from a magnetic disk by reader 240 may take place during a read operation (e.g., a read operation of HDD 100).

Writer 250 is configured to generate a magnetic field in response to a current passed through a writer coil of writer 250. Writer 250 may direct the magnetic field toward a magnetic disk to write bits of data on the magnetic disk (e.g., during a write operation of HDD 100, for later retrieval by reader 240 during a read operation of HDD 100).

Laser 260 is configured to emit electromagnetic radiation. Laser 260 may, for example, emit electromagnetic radiation having a wavelength in the near infrared range (e.g., approximately 830 nm) or visible range. Examples of laser 260 include an optically pumped semiconductor laser, a quantum well laser, an integrated laser, or other suitable laser. Laser 260 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 260 of FIG. 2 is coupled to slider body 222 via submount 262. In the example of FIG. 2, laser 260 and submount 262 are located on a face of slider body 222 that is opposite to media-facing surface 205. In some examples, a laser may be directly mounted to slider body 222. In some examples, a laser may be integrated into slider body 222. For example, a laser may be fabricated and integrated into slider body 222 through on-wafer laser (OWL) processing. Steps of OWL processing may include the growth of an epitaxial layer or stack on a donor substrate, patterning of the epitaxial layer or stack on the donor substrate, transfer of the patterned epitaxial layer or stack from the donor to a wafer on which HAMR head 230 is being fabricated (e.g., a wafer that includes some components of HAMR head 230 that have already been fabricated), and further processing of the epitaxial layer or stack to form the final profile and features of the laser.

Waveguide 270 is configured to receive electromagnetic radiation that laser 260 emits and propagate the electromagnetic radiation toward and proximal to NFT 280. Waveguide 270 may include a material or materials that facilitate the propagation of electromagnetic radiation from laser 260 toward NFT 280. In some examples, waveguide 270 includes a material having a high refractive index (e.g., greater than 1.5) and that is optically transparent at the wavelength of the electromagnetic radiation from laser 260. In some examples, waveguide 270 includes niobium oxide. In some examples, waveguide 270 includes multiple optical layers. Waveguide 270, for example, may include a waveguide core and one or more cladding layers. In some examples, a waveguide core includes a dielectric material (e.g., niobium oxide, tantalum oxide) and a cladding layer includes another, different dielectric material (e.g., aluminum oxide, silicon dioxide).

Waveguide 270 is formed integrally within slider body 222. Submount 262 may be configured to redirect electromagnetic radiation output from laser 260 so that the electromagnetic radiation is directed through waveguide 270 in the negative y-direction of FIG. 2 (e.g., toward NFT 280). The path between laser 260 and waveguide 270 may include one or more optical couplers, mode converters, and/or mode couplers. Waveguide 270 may include mode converters. In examples where a laser is integrated into slider body 222 (e.g., OWL processing), waveguide 270 may include one or more bends or curvatures to enable propagation of electromagnetic radiation from the integrated laser toward NFT 280.

Electromagnetic radiation that laser 260 emits and waveguide 270 propagates toward NFT 280 may couple to free electrons of NFT 280 (e.g., through resonance coupling) and produce localized surface plasmons (LSPs) on NFT 280. NFT 280 is configured to focus and emit an optical near-field of LSPs, for example a distribution of LSPs that are excited on NFT 280 through coupling with electromagnetic radiation from waveguide 270. NFT 280 may focus and emit an optical near-field on a small spot on a magnetic disk surface that is proximal to HAMR head 230 (e.g., a magnetic disk 108 of FIG. 1). Energy of an emitted optical near-field may heat and lower the coercivity of magnetic grains in the spot of focus on the magnetic disk, thereby enabling a magnetic field from writer 250 to orient magnetic moments of the magnetic grains and thus enabling writing of bits of data on the magnetic disk.

Figure 3:
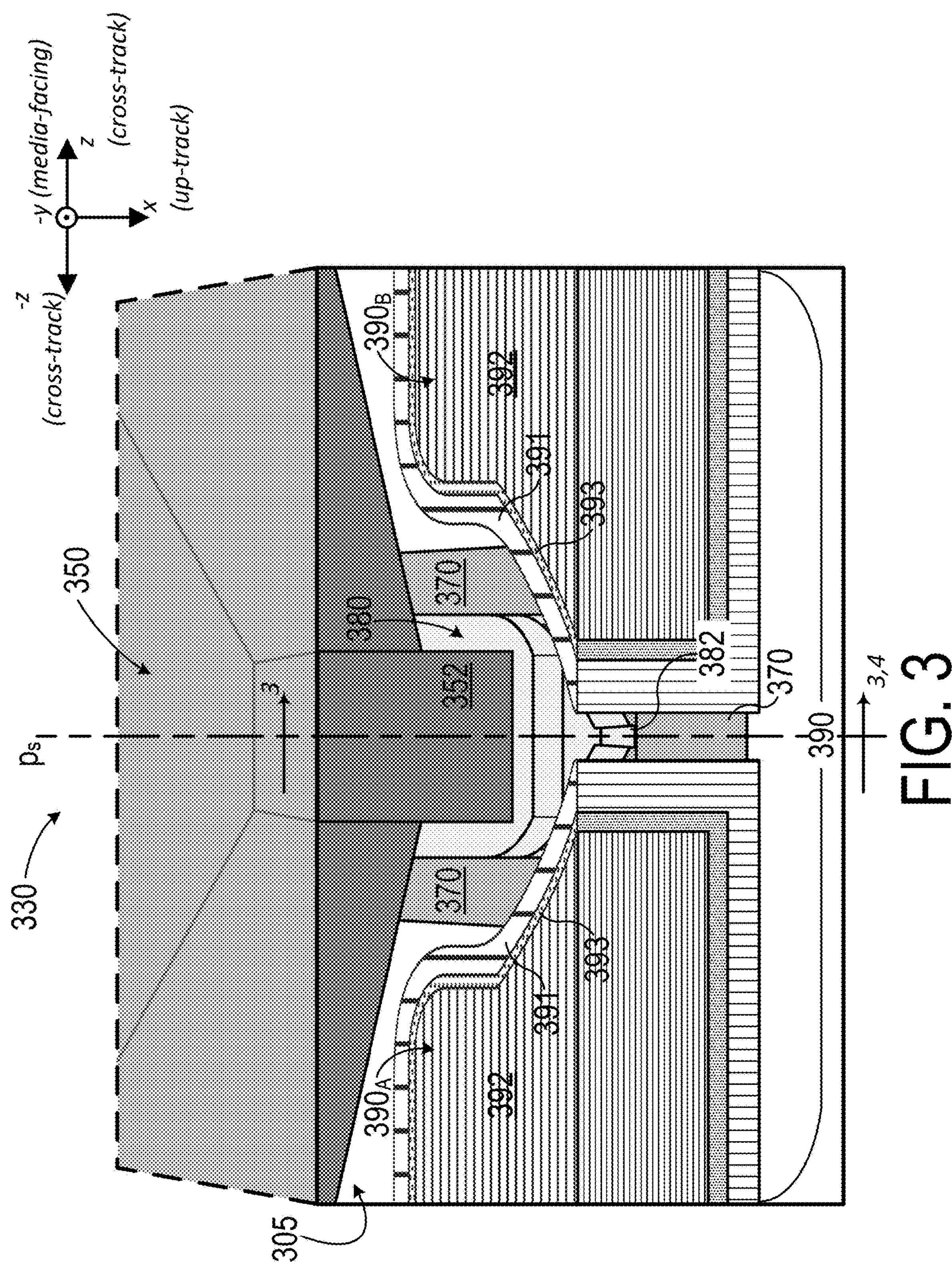
FIG. 3 is a perspective view of an example HAMR head, in accordance with aspects of this disclosure.

FIG. 3 is a perspective view of an example HAMR head, in accordance with aspects of this disclosure. HAMR head 330 of FIG. 3 may be an example of HAMR head 230 of FIG. 2. HAMR head 330 includes a writer 350, a waveguide 370, an NFT 380, and a resonance enhancing feature 390.

Writer 350 includes a write pole 352 that is configured to focus and direct magnetic flux that writer 350 generates. In the example of HAMR head 330 of FIG. 3, a portion of write pole 352 is provided on a media-facing surface 305 of HAMR head 330. Media-facing surface 305 may face and be held proximate to a moving surface of a magnetic disk during write operations of an HDD (e.g., HDD 100 of FIG.

1), enabling magnetic flux from write pole 352 to be directed toward the surface of the magnetic disk.

FIG. 3 illustrates an end of waveguide 370 that is proximal to NFT 380. Waveguide 370 may propagate electromagnetic radiation (e.g., from laser 260 of FIG. 2) toward and proximal to NFT 380. The end of waveguide 370 that is illustrated in FIG. 3 may be a location of coupling between electromagnetic radiation in waveguide 370 and free electrons in NFT 380. NFT 380 is disposed between writer 350 and waveguide 370. In some examples, NFT 380 is coupled to waveguide 370, for example to a cladding layer of waveguide 370. In some examples, a layer of material may be disposed between NFT 380 and a waveguide core of waveguide 370, for example a material having a different refractive index than the waveguide core of waveguide 370. In some examples, a feature or features such as a grating may be included and disposed between NFT 380 and waveguide 370. Such materials and/or features may be included to promote coupling between electromagnetic radiation in waveguide 370 and free electrons of NFT 380.

NFT 380 may include a plasmonic metal. As used herein, a plasmonic metal is a metal that possesses properties (e.g., electrical properties, optical properties) that promote resonance coupling between photons incident upon the plasmonic metal and free electrons of the plasmonic metal. Examples of plasmonic metals include gold, silver, ruthenium, copper, aluminum, and rhodium, among others. NFT 380 may include an alloy that includes a plasmonic metal. In some examples, NFT 380 includes a plasmonic metal and a noble metal (e.g., palladium, osmium, iridium, or platinum).

NFT 380 may have specific properties and/or features (e.g., shape, dimensions, physical features) that promote and enhance the processes of exciting LSP modes. For example, NFT 380 may have a shape and dimensions that promote resonance between electromagnetic radiation and free electrons to excite a specific plasmonic mode or modes. In some examples, NFT 380 includes a feature or features that support the emission of a near-field. A peg 382 of NFT 380, for example, is a narrow protrusion from NFT 380 that is disposed proximal to media-facing surface 305 and is configured to amplify and focus a near-field that NFT 380 emits. In some instances, one or more portions of peg 382 are exposed on media-facing surface 305.

In accordance with aspects of this disclosure, HAMR head 330 includes a resonance enhancing feature 390 that is configured to increase resonance efficiency between electromagnetic radiation (e.g., from laser 260 of FIG. 2) and free electrons of NFT 380. In some examples, resonance enhancing feature 390 may reflect, repel, direct, and/or otherwise contain an electric field in proximity to NFT 380 in order to improve resonance efficiency on NFT 380. Resonance enhancing feature 390 may, for example, direct an electric field of electromagnetic radiation from waveguide 370 toward NFT 380, and/or may redistribute an electric field on NFT 380. A higher resonance efficiency may, in some instances, reduce the optical power, such as laser power, that is required to operate HAMR head 330. Reducing the laser power that is required to operate HAMR head 330 may, in some scenarios, reduce the temperature of NFT 380 and/or of other features of HAMR head 330 during operation. A lower operating temperature of NFT 380 and other features may reduce the formation of thermally induced defects, potentially improving the reliability and/or extending the lifetime of HAMR head 330.

Resonance enhancing feature 390 is disposed proximal to NFT 380 and to media-facing surface 305. Resonance enhancing feature 390 includes a first segment 390$_A$ and a second segment 390$_B$. Segments 390$_A$ and 390$_B$ are disposed on opposite sides of NFT 380 relative to a cross-track dimension z of HAMR head 330. NFT 380 is divided into substantially symmetric halves by a plane of symmetry $p_s$ that is substantially parallel to a media-facing −y dimension and up-track x dimension of HAMR head 330. First segment 390$_A$ and second segment 390$_B$ may be substantially symmetric about plane of symmetry $p_s$.

Each of first segment 390$_A$ and second segment 390$_B$ of resonance enhancing feature 390 includes a liner 391 and a filler 392. Each liner 391 partially faces NFT 380. Each filler 392 is disposed distal to NFT 380 relative to liner 391 of the respective segment 390$_A$ or 390$_B$. Liner 391 of each of first segment 390$_A$ and second segment 390$_B$ partially encloses filler 392 of the respective segment 390$_A$ or 390$_B$.

Liners 391 may include a material or materials having optical properties that promote resonance enhancement on NFT 380. For example, a material of liners 391 may have optical properties that enable reflection, repulsion, and/or direction of electric fields. Liners 391 may include one or more metals. In some examples, liner 391 include at least one of gold, aluminum, copper, rhodium, or ruthenium.

Fillers 392 may include a material or materials having certain physical properties such as high thermal conductivity and/or mechanical robustness (e.g., hardness, ductility). Fillers 392 may include one or more metals. In some examples, fillers 392 include at least one of rhodium, ruthenium, copper, gold, chromium, platinum, nickel, nickel-copper alloy, nickel-iron alloy, copper-nickel-iron alloy, iron-cobalt alloy, or nickel-cobalt alloy.

Liners 391 and fillers 392 may each include a material that comprises a majority of an atomic percent of liners 391 and fillers 392, respectively. In some examples, a material that comprises a majority of an atomic percent of each liner 391 is different than a material that comprises a majority of an atomic percent of each respective filler 392. In some examples, a material that comprises a majority of an atomic percent of each liner 391 is the same as a material that comprises a majority of an atomic percent of each respective filler 392.

In the example of resonance enhancing feature 390 of HAMR head 330, each of first segment 390$_A$ and second segment 390$_B$ further includes a diffusion barrier 393 that is disposed between and coupled to a respective liner 391 and filler 392. Each diffusion barrier 393 is configured to mitigate diffusion of material(s) (e.g., metal atoms) between respective liners 391 and fillers 392. In some examples, diffusion barriers 393 include at least one of cobalt, ruthenium, titanium, chromium, platinum, tungsten, tantalum, titanium-tungsten alloy, titanium nitride, tantalum nitride, aluminum nitride, zirconium nitride, or hafnium nitride.

While first segment 390$_A$ and second segment 390$_B$ may share common identifiers in FIG. 3 for liner 391, filler 392, diffusion barrier 393, and other features, it should be understood that the aspects of each of these features (e.g., dimensions, shape, common) are not necessarily identical for first segment 390$_A$ and second segment 390$_B$. That is, while a common identifier may be used for both segments 390$_A$ and 390$_B$, geometric, composition, and/or other variations may exist for the identifier with respect each segment.

Figure 4:
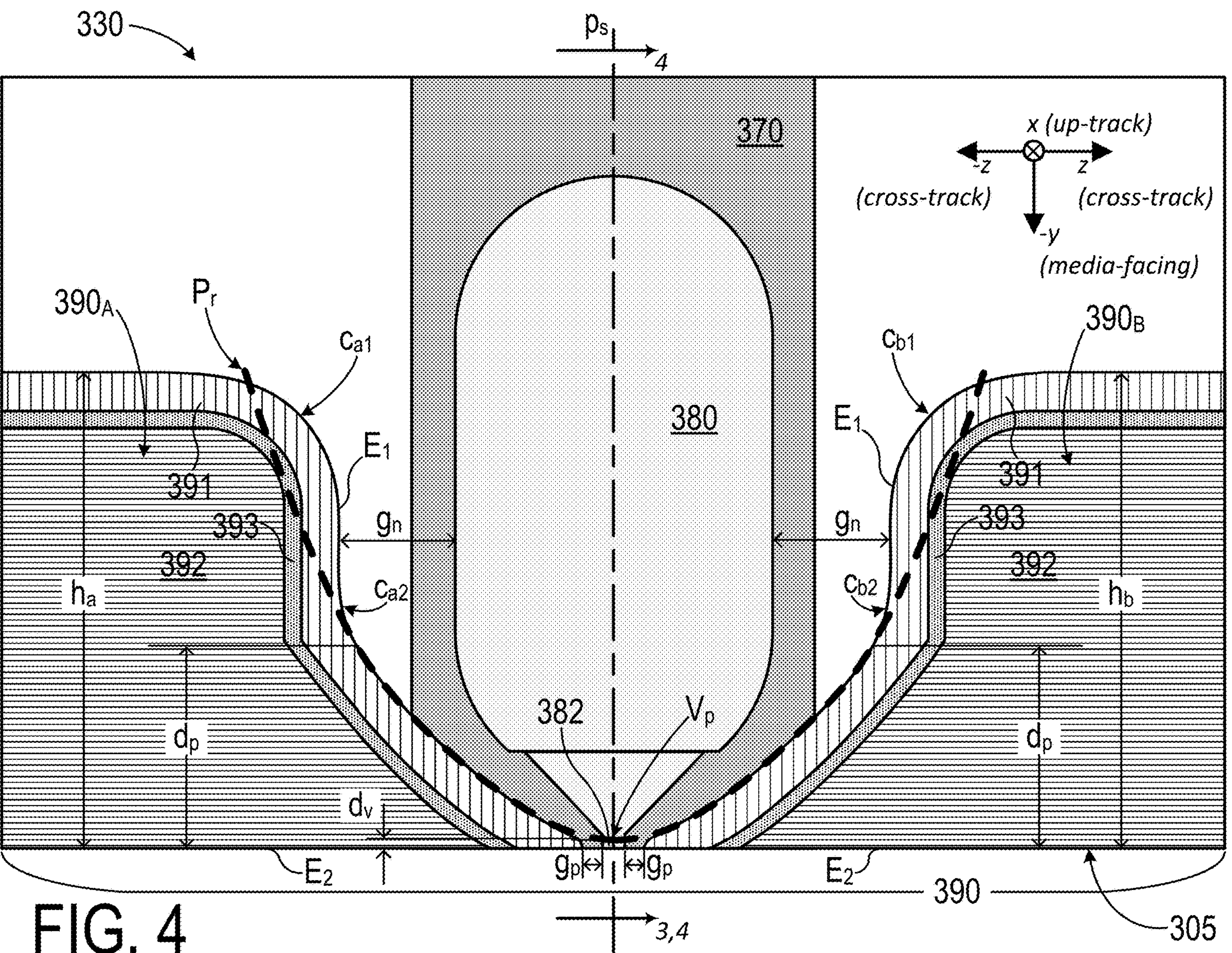
FIG. 4 is a view of an example HAMR head, in accordance with aspects of this disclosure.

FIG. 4 is a view of an example HAMR head, in accordance with aspects of this disclosure. FIG. 4 is a view of HAMR head 330 of FIG. 3 along an up-track x direction. HAMR head 330 of FIG. 4 includes waveguide 370, NFT 380, and resonance enhancing feature 390. Resonance enhancing feature 390 includes a first segment 390$_A$ and a second segment 390 disposed on opposite sides of NFT 380 relative to a cross-track dimension z of HAMR head 330. NFT 380 is divided into substantially symmetric halves by a plane of symmetry $p_s$ that is substantially parallel to a media-facing −y dimension and an up-track x dimension of HAMR head 330. First segment 390$_A$ and second segment 390$_B$ may be substantially symmetric about plane of symmetry $p_s$.

Each of first segment 390$_A$ and second segment 390$_B$ has a height $h_a$ and $h_b$, respectively, in a media-facing −y dimension of HAMR head 330. In some examples, height $h_a$ of first segment 390$_A$ is substantially the same as height $h_b$ of second segment 390$_B$.

Each of first segment 390$_A$ and second segment 390$_B$ includes a first edge $E_1$ and a second edge $E_2$. First edge $E_1$ and second edge $E_2$ of each of first segment 390$_A$ and second segment 390$_B$ intersect and terminate at a position that is proximal to or coincident with media-facing surface 305. Each of the positions where the first edge $E_1$ and the second edge $E_2$ of each of the first segment 390$_A$ and the second segment 390$_B$ intersect and terminate is separated from peg 382 of NFT 380 by a gap $g_p$ in a cross-track z dimension of HAMR head 330. In the example of HAMR head 330, each second edge $E_2$ is substantially parallel to media-facing surface 305.

A part of first edge $E_1$ of each of first segment 390$_A$ and second segment 390$_B$ faces NFT 380. Each first edge $E_1$ is separated from NFT 380 by a gap $g_n$ in the cross-track z dimension. First edge $E_1$ of each of first segment 390$_A$ and second segment 390$_B$ traces a curvature $c_{a1}$ and $c_{b1}$, respectively, away from NFT 380 and extends substantially parallel to media-facing surface 305 on a side of the respective segment 390$_A$ or 390$_B$ that is distal to media-facing surface 305.

Parts of first edges $E_1$ that face NFT 380 comprise a profile around a part of NFT 380 when viewed along an up-track x dimension of HAMR head 330. In some examples, the profile includes a substantially parabolic profile $P_r$ having a vertex $V_p$ that is proximal to media-facing surface 305. $V_p$ may be an approximate distance dv from media-facing surface 305. In some instances, NFT 380 and substantially parabolic profile $P_r$ share plane of symmetry $p_s$. In other instances, substantially parabolic profile $P_r$ may include two or more adjacent, offset (e.g., in the cross-track z dimension) substantially parabolic profiles that superimpose to form substantially parabolic profile $P_r$. In such examples, substantially parabolic profile $P_r$ may include multiple vertices $V_p$, for example, one for each superimposed substantially parabolic profile. In these and other instances, substantially parabolic profile $P_r$ may not be a perfectly geometric parabola and may further include some dimensional variation that results from manufacturing. Therefore, the term "substantially parabolic" is used herein to describe a general shape of edges $E_1$ of resonance enhancing feature 390 but is not intended to imply any geometric limitations.

The substantially parabolic profile $P_r$ part of the profile comprising parts of edges $E_1$ is proximal to media-facing surface 305 of heat-assisted. The profile comprising parts of edges $E_1$ deviates from substantially parabolic profile $P_r$ at an approximate distance $d_p$ from the media-facing surface 305 in the media-facing −y dimension. Edges $E_1$ of first segment 390$_A$ and second segment 390$_B$ deviate from substantially parabolic profile $P_r$ by tracing a respective curvature $c_{a2}$ and $c_{b2}$ toward NFT 380 and extending substantially parallel to the media-facing −y dimension.

While first segment 390$_A$ and second segment 390$_B$ may share common identifiers in FIG. 4 for edges $E_1$ and $E_2$, gaps $g_n$ and $g_p$, distance $d_p$, and other dimensions, it should be understood that the aspects of each of these dimensions or features (e.g., length, shape) are not necessarily identical for first segment 390$_A$ and second segment 390$_B$. That is, while a common identifier may be used for both segments 390$_A$ and 390$_B$, geometric and/or other variations may exist for the identifier with respect each segment.

Figure 5:
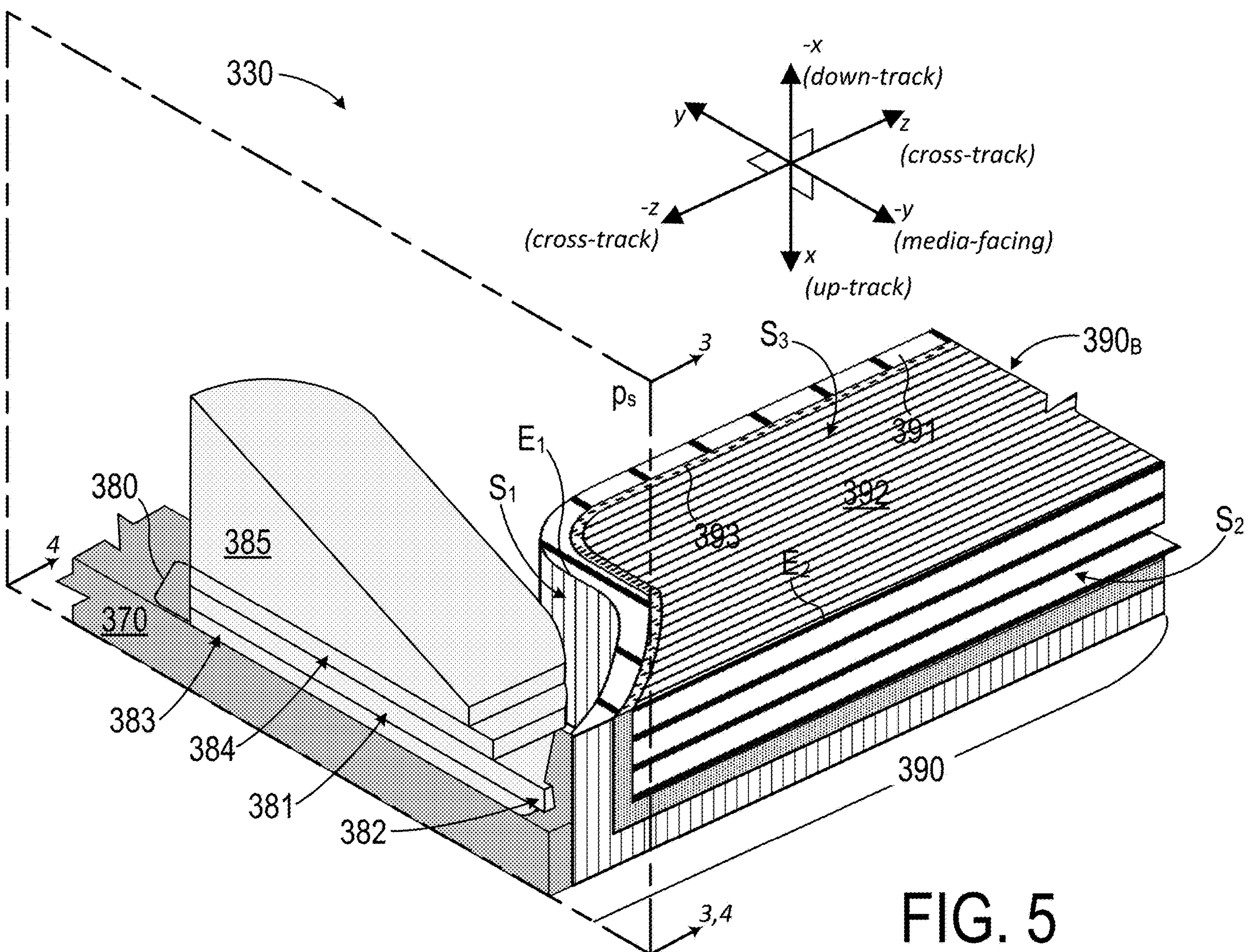
FIG. 5 is a cross-sectional perspective view of an example HAMR head, in accordance with aspects of this disclosure.

FIG. 5 is a cross-sectional perspective view of an example HAMR head, in accordance with aspects of this disclosure. FIG. 5 is a cross-sectional perspective view of HAMR head 330 of FIG. 3 and FIG. 4, with the cross-section taken along the plane of symmetry $p_s$ and the view in the direction of the arrows (3 and 3,4 for FIG. 3 view, 4 and 3,4 for FIG. 4 view). The cross-section illustrated in FIG. 5 shows second segment 390$_B$ of resonance enhancing feature 390. However, the description of features and aspects hereinafter also applies to first segment 390$_A$ of FIG. 3 and FIG. 4.

Segment 390$_B$ of resonance enhancing feature 390 is elongated in a cross-track z dimension of HAMR head 330. Edge $E_1$ of segment 390$_B$ extends a length in the up-track x dimension of HAMR head 330, the extension of edge $E_1$ defining a first surface $S_1$ of segment 390$_B$. A part of surface $S_1$ faces NFT 380. Edge $E_2$ of segment 390$_B$ extends a length in the up-track x dimension, the extension of edge $E_2$ defining a second surface $S_2$ of segment 390$_B$. Second surface $S_2$ is proximal to or coincident with, and substantially parallel to the media-facing surface 305.

First surface $S_1$ and second surface $S_2$ of segment 390$_B$ intersect and terminate at an intersection that is proximal to or coincident with, and substantially parallel to media-facing surface 305. First surface $S_1$ of segment 390$_B$ includes a part of liner 391 of segment 390$_B$. Second surface $S_2$ of segment 390$_B$ includes a part of liner 391, a part of filler 392, and a part of diffusion barrier 393 of segment 390$_B$.

Segment 390$_B$ includes a surface $S_3$ that is substantially orthogonal to the up-track x dimension of HAMR head 330. Surface $S_3$ includes a part of liner 391, a part of filler 392, and a part of diffusion barrier 393 of segment 390$_B$.

NFT 380 includes peg 382, an anchor disk 381, a plasmonic disk 383, and a middle disk 384. Peg 382 is disposed proximal to media-facing surface 305. Anchor disk 381 is disposed behind peg 382 relative to the media-facing surface 305. Anchor disk 381 is configured to support a distribution of LSPs. In some examples, anchor disk 381 is configured to participate in LSP generation. For example, peg 382 may heat a spot on a surface of a magnetic disk by receiving and condensing a distribution of LSPs from anchor disk 381 and/or other features, amplifying a near-field of the LSP distribution, and emitting the amplified near-field toward the surface of the magnetic disk.

In some examples, peg 382 and anchor disk 381 are part of continuous feature. That is, peg 382 and anchor disk 381 may be regions or features of a single piece, for example, deposited during a single manufacturing level or step (e.g., a photolithography level, a metal deposition step), with the shape and dimensions of peg 382 and anchor disk 381 defined by a lithography pattern. Peg 382 may protrude from anchor disk 381 in the vicinity of media-facing surface 305 to enable LSPs to be transferred from anchor disk 381 to peg 382 and to enable peg 382 to amplify and emit a near-field toward a magnetic disk. In some examples, peg 382 and anchor disk 381 each include one or more of the same materials. For example, peg 382 and anchor disk 381 may both include iridium, rhodium, ruthenium, gold alloy(s), gold composite(s) (e.g., a gold-nanoparticle composite), or combinations thereof.

Plasmonic disk 383 is disposed between anchor disk 381 and waveguide 370. Plasmonic disk 383 is configured to generate and support LSPs through resonance coupling of free electrons with incident electromagnetic radiation (e.g., photons from laser 260 of FIG. 2). Plasmonic disk 383 may include a plasmonic metal. As used herein, a plasmonic metal is a metal that possesses properties (e.g., electrical properties, optical properties) that promote resonance coupling between electromagnetic radiation incident upon the plasmonic metal and free electrons of the plasmonic metal. Such resonant coupling of electromagnetic radiation with free electrons of the plasmonic metal may excite one or more plasmonic modes of the plasmonic metal, which may result in the generation of an LSP on the plasmonic metal. Plasmonic metals that demonstrate efficient plasmon generation in response to electromagnetic radiation of a wavelength target or range are said to have a high plasmonic figure of merit. Examples of plasmonic metals include gold, silver, ruthenium, copper, aluminum, and/or rhodium. In some instances, plasmonic disk 383 includes one of these plasmonic metals, an alloy of one of these plasmonic metals, and/or another noble metal including palladium, osmium, iridium, or platinum.

Middle disk 384 is disposed in a down-track −x direction of HAMR head 330 relative to anchor disk 381 and is coupled anchor disk 381. In some examples. middle disk 384 is configured to direct localized surface plasmons toward peg 382. In some examples, middle disk 384 is configured to mitigate background fields. In some examples, middle disk 384 includes at least one of gold, iridium, rhodium, copper, tantalum, tungsten, or ruthenium.

HAMR head 330 of FIG. 3 further includes a heat sink 385. Heat sink 385 is disposed in a down-track −x direction relative to middle disk 384 and is coupled to middle disk 384. Heat sink 385 is configured to draw heat away from regions of NFT 380 and direct the heat toward other regions of HAMR head 330. In some examples, heat sink 385 is coupled to another heat sink feature that is disposed between heat sink 385 and a writer of HAMR head 330 (e.g., writer 350 of FIG. 3). Heat sink 385 may include a thermally conductive material (e.g., gold). In some examples, heat sink 385 includes rhodium, copper, tungsten, tantalum, iridium, platinum, ruthenium, nickel, iron, or combinations thereof.

Various examples have been presented for the purposes of illustration and description. These and other examples are within the scope of the following claims.

What is claimed is:

1. A heat-assisted magnetic recording head comprising:

a near-field transducer configured to focus and emit an optical near-field;

a waveguide configured to receive electromagnetic radiation and propagate the electromagnetic radiation toward and proximal to the near-field transducer; and a resonance enhancing feature disposed proximal to the near-field transducer and to a media-facing surface of the heat-assisted magnetic recording head, the resonance enhancing feature comprising a first segment and a second segment disposed on opposite sides of the near-field transducer relative to a cross-track dimension of the heat-assisted magnetic recording head, wherein each of the first segment and the second segment of the resonance enhancing feature comprises:

a liner comprising an edge with a portion that is at least partially exposed and with a portion that at least partially faces the near-field transducer; and a filler disposed distal to the near-field transducer relative to the liner.

2. The heat-assisted magnetic recording head of claim 1, wherein the near-field transducer is divided into substantially symmetric halves by a plane of symmetry that is substantially parallel to a media-facing dimension and an up-track dimension of the heat-assisted magnetic recording head, and wherein the first segment and the second segment are substantially symmetric about the plane of symmetry.

3. The heat-assisted magnetic recording head of claim 1, wherein the liner at least partially encloses the filler.

4. The heat-assisted magnetic recording head of claim 1, wherein each of the first segment and the second segment comprises a surface that is proximal to or coincident with, and substantially parallel to the media-facing surface of the heat-assisted magnetic recording head, the surface of each of the first segment and the second segment comprising a part of the liner and a part of the filler of the respective segment.

5. The heat-assisted magnetic recording head of claim 1, wherein each of the first segment and the second segment comprises a surface that is substantially orthogonal to an up-track dimension of the heat-assisted magnetic recording head, the surface of each of the first segment and the second segment comprising a part of the liner and a part of the filler of the respective segment.

6. The heat-assisted magnetic recording head of claim 1, wherein the liner comprises at least one of gold, aluminum, copper, rhodium, or ruthenium.

7. The heat-assisted magnetic recording head of claim 1, wherein the filler comprises at least one of rhodium, ruthenium, copper, gold, chromium, platinum, nickel, nickel-copper alloy, nickel-iron alloy, copper-nickel-iron alloy, iron-cobalt alloy, or nickel-cobalt alloy.

8. The heat-assisted magnetic recording head of claim 1, wherein a material that comprises a majority of an atomic percent of the liner is different than a material that comprises a majority of an atomic percent of the filler.

9. The heat-assisted magnetic recording head of claim 1, wherein a material that comprises a majority of an atomic percent of the liner is the same as a material that comprises a majority of an atomic percent of the filler.

10. The heat-assisted magnetic recording head of claim 1, wherein each of the first segment and the second segment further comprises a diffusion barrier that is disposed between and coupled to the liner and the filler.

11. The heat-assisted magnetic recording head of claim 10, wherein the diffusion barrier comprises at least one of cobalt, ruthenium, titanium, chromium, platinum, tungsten, tantalum, titanium-tungsten alloy, titanium nitride, tantalum nitride, aluminum nitride, zirconium nitride, or hafnium nitride.

12. The heat-assisted magnetic recording head of claim 1, wherein the near-field transducer comprises:

a peg configured to amplify and focus a near-field that the near-field transducer emits, the peg disposed proximal to the media-facing surface of the heat-assisted magnetic recording head; and an anchor disk disposed behind the peg relative to the media-facing surface.

13. The heat-assisted magnetic recording head of claim 12, wherein the near-field transducer further comprises a plasmonic disk disposed between the anchor disk and the waveguide.

14. The heat-assisted magnetic recording head of claim 12, wherein the near-field transducer further comprises a middle disk disposed in a down-track direction of the heat-assisted magnetic recording head relative to the anchor disk and coupled to the anchor disk.

15. A heat-assisted magnetic recording head comprising:

a near-field transducer configured to focus and emit an optical near-field;

a waveguide configured to receive electromagnetic radiation and propagate the electromagnetic radiation toward and proximal to the near-field transducer; and a resonance enhancing feature disposed proximal to the near-field transducer and to a media-facing surface of the heat-assisted magnetic recording head, the resonance enhancing feature comprising a first segment and a second segment disposed on opposite sides of the near-field transducer relative to a cross-track dimension of the heat-assisted magnetic recording head, wherein each of the first segment and the second segment of the resonance enhancing feature comprises:

a liner that at least partially faces the near-field transducer; and a filler disposed distal to the near-field transducer relative to the liner, wherein the liner of each of the first segment and the second segment comprises an edge, wherein a part of the edge of each liner of the first segment and the second segment faces the near-field transducer, and wherein the edge of each liner of the first segment and the second segment is separated from the near-field transducer by a gap.

16. The heat-assisted magnetic recording head of claim 15, wherein the edge of the liner of each of the first segment and the second segment traces a curvature away from the near-field transducer and extends substantially parallel to the media-facing surface on a side of the respective segment that is distal to the media-facing surface.

17. The heat-assisted magnetic recording head of claim 15, wherein the part the edge of the liner of each of the first segment and the second segment that faces the near-field transducer comprises a profile around a part of the near-field transducer when viewed along an up-track dimension of the heat-assisted magnetic recording head.

18. The heat-assisted magnetic recording head of claim 17, wherein the edge of the liner of each of the first segment and the second segment extends a length in an up-track dimension of the heat-assisted magnetic recording head, the extension of the edge of each of the first segment and the second segment defining a surface of each of the first segment and the second segment, respectively, and wherein at least a part of the surface of each of the first segment and the second segment faces the near-field transducer.

19. The heat-assisted magnetic recording head of claim 17, wherein the profile comprising the part of the edge of the liner of each of the first segment and the second segment comprises a substantially parabolic profile, wherein a vertex of the substantially parabolic profile is proximal to the media-facing surface of the heat-assisted magnetic recording head, and wherein the near-field transducer and the substantially parabolic profile share a plane of symmetry that is substantially parallel to a media-facing dimension and an up-track dimension of the heat-assisted magnetic recording head.

20. The heat-assisted magnetic recording head of claim 19, wherein the substantially parabolic profile is proximal to the media-facing surface of the heat-assisted recording head, and wherein the profile comprising the part of the edge of each of the first segment and the second segment deviates from the substantially parabolic profile at an approximate distance from the media-facing surface in a media-facing dimension of the heat-assisted magnetic recording head.

21. The heat-assisted magnetic recording head of claim 20, wherein the edge of the liner of the first segment and the edge of the liner of the second segment deviate from the substantially parabolic profile by tracing a curvature toward the near-field transducer and extending substantially parallel to the media-facing dimension.

22. The heat-assisted magnetic recording head of claim 15, wherein the edge of the liner of each of the first segment and the second segment are first edges of the first segment and the second segment, respectively, wherein each of the first segment and the second segment comprises a second edge that is substantially parallel to the media-facing surface of the heat-assisted magnetic recording head, and wherein the first edge and the second edge of each of the first segment and the second segment intersect and terminate at a position that is proximal to or coincident with the media-facing surface.

23. The heat-assisted magnetic recording head of claim 22, wherein each of the first and second edges of the first segment and the second segment extend a length in an up-track dimension of the heat-assisted magnetic recording head, the extension of each of the first and second edges defining a first and second surface of each of the first segment and the second segment, wherein at least a part of the first surface of each of the first segment and the second segment faces the near-field transducer, and wherein the second surface of each of the first segment and the second segment is proximal to or coincident with, and substantially parallel to the media-facing surface of the heat-assisted magnetic recording head.

24. The heat-assisted magnetic recording head of claim 23, wherein the first surface and the second surface of each of the first segment and the second segment intersect and terminate at an intersection that is proximal to or coincident with, and substantially parallel to the media-facing surface of the heat-assisted magnetic recording head.

25. The heat-assisted magnetic recording head of claim 23, wherein the first surface of each of the first segment and the second segment comprises a part of the liner of the respective segment, and wherein the second surface of each of the first segment and the second segment comprises a part of the liner and a part of the filler of the respective segment.

26. The heat-assisted magnetic recording head of claim 25, wherein each of the first segment and the second segment further comprises a diffusion barrier that is disposed between and coupled to the liner and the filler, and wherein the second surface of each of the first segment and the second segment further comprises a part of the diffusion barrier of the respective segment.

27. The heat-assisted magnetic recording head of claim 22, wherein each of the positions where the first edge and the second edge of each of the first segment and the second segment intersect and terminate is separated from a peg of the near-field transducer by a gap.

28. A heat-assisted magnetic recording head comprising:

a near-field transducer configured to focus and emit an optical near-field;

a waveguide configured to receive electromagnetic radiation and propagate the electromagnetic radiation toward and proximal to the near-field transducer; and a resonance enhancing feature disposed proximal to the near-field transducer and to a media-facing surface of the heat-assisted magnetic recording head, the resonance enhancing feature comprising a first segment and a second segment disposed on opposite sides of the near-field transducer relative to a cross-track dimension of the heat-assisted magnetic recording head, wherein each of the first segment and the second segment of the resonance enhancing feature comprises:

a liner comprising an edge with a portion that is at least partially exposed and with a portion that at least partially faces the near-field transducer; and a filler disposed distal to the near-field transducer relative to the liner, wherein each of the first segment and the second segment has a height in a media-facing dimension of the heat-assisted magnetic recording head, and wherein each of the first segment and the second segment are elongated in the cross-track dimension of the heat-assisted magnetic recording head.

29. The heat-assisted magnetic recording head of claim 28, wherein the height of the first segment is substantially the same as the height of the second segment.

* * * * *